United States Patent
Yee et al.

(10) Patent No.: US 12,210,923 B2
(45) Date of Patent: Jan. 28, 2025

(54) AUTHENTICATION CARD WITH INTEGRATED CLOTH

(71) Applicant: Capital One Services, LLC, McLean, VA (US)

(72) Inventors: Bryant Yee, Silver Spring, MD (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/185,171

(22) Filed: Mar. 16, 2023

(65) Prior Publication Data
US 2024/0311607 A1   Sep. 19, 2024

(51) Int. Cl.
| | |
|---|---|
| *G06K 19/077* | (2006.01) |
| *B32B 37/18* | (2006.01) |
| *G06K 19/02* | (2006.01) |
| *G06K 19/07* | (2006.01) |

(52) U.S. Cl.
CPC ...... *G06K 19/07722* (2013.01); *B32B 37/182* (2013.01); *G06K 19/027* (2013.01); *G06K 19/0723* (2013.01); *B32B 2425/00* (2013.01)

(58) Field of Classification Search
CPC .......... G06K 19/07722; G06K 19/027; G06K 19/0723; B32B 37/182; B32B 2425/00
See application file for complete search history.

(56) References Cited

U.S. PATENT DOCUMENTS

| 5,903,439 A | * | 5/1999 | Tamarkin | H01R 12/73 |
| | | | | 361/742 |
| 5,949,050 A | * | 9/1999 | Fosbenner | G09F 9/375 |
| | | | | 273/293 |
| 6,344,253 B1 | * | 2/2002 | Pioventini | E02D 31/004 |
| | | | | 428/116 |
| 10,357,989 B1 | * | 7/2019 | Herrington | B32B 27/40 |
| 2006/0292946 A1 | * | 12/2006 | Kiekhaefer | B42D 25/455 |
| | | | | 442/43 |
| 2014/0174645 A1 | * | 6/2014 | Segura | B32B 37/206 |
| | | | | 156/247 |
| 2019/0057294 A1 | * | 2/2019 | Suthar | B32B 3/30 |
| 2020/0069017 A1 | * | 3/2020 | Yap | A45C 11/32 |
| 2020/0193256 A1 | * | 6/2020 | Suthar | B32B 15/08 |
| 2021/0221092 A1 | * | 7/2021 | Zeng | B32B 27/12 |

* cited by examiner

*Primary Examiner* — Sonji N Johnson
*Assistant Examiner* — Asifa Habib
(74) *Attorney, Agent, or Firm* — Foley & Lardner LLP

(57) ABSTRACT

Authentication card with integrated cloth. In some aspects, an authentication card for short range wireless communications includes a first card layer comprising a first cutout, a second card layer, and a fabric layer fastened between the first and second card layer, where the fabric layer is exposed through the first cutout. A microchip may be provided on the first card layer, wherein the microchip is coupled with an antenna enabling authentication (e.g., contactless) by employing radio frequency identification (RFID) or near field communication (NFC).

20 Claims, 7 Drawing Sheets

AUTHENTICATION CARD WITH INTEGRATED CLOTH

SUMMARY

Many physical impurities and contaminants (e.g., oils, dust, other particulates, bacteria, etc.) can cause damage or malfunction to items, such as authentication cards or screens of devices (e.g., touch screens on mobile devices). For example, in touch screens of devices, a buildup of dust, oil, and bacteria on the surface may cause the surface to deteriorate and become less responsive. Frequent usage of such mobile devices also means increased exposure to harmful bacteria and germs, increasing a likelihood of illness in users.

In authentication cards, accumulated oils and dirt on magnetic stripes may make it difficult for card readers to read the information stored on the card and properly perform authentication functionality (e.g., card/card owner may not be recognized). Oils on the surface of authentication cards can also attract dust and other particles, which can further damage the card, making usage difficult, and causing the card to wear out faster. This may lead to a need to replace the card more frequently.

Sanitizing items such as authentication cards or mobile devices using harsh chemicals, or otherwise washing using soap and water may be time-consuming and inconvenient. Doing so may damage a chip or magnetic stripe of the authentication card. Most mobile device manufacturers do not recommend washing phones in water as letting water sit in a device may lead to corrosion of circuits, coils and resistors due to the minerals in the water. Disinfectants may wear down oleophobic coatings on touch screens which are designed to keep devices fingerprint- and moisture-free.

Accordingly, a mechanism is desired that would enable individuals or entities to allow continued efficiency and sustainability of items such as authentication cards and mobile devices. In particular, a convenient and efficient method of removing physical impurities and contaminants is desired. One mechanism to allow convenient removal of physical impurities and contaminants includes a proximate fabric (e.g., microfiber) provided in an authentication card. In particular, by providing a fabric layer fastened to one or more card layers of an authentication card, a user may easily remove oils, bacteria, and dirt from other authentication cards or mobile devices in a user's possession.

In some aspects, disclosed embodiments relate to an authentication card with an integrated cloth. As referenced to herein, an integrated cloth may include a cloth (e.g., fabric) fastened to one or more card layers of an authentication card. The authentication card for short range wireless communications may include a first card layer comprising a first cutout, a second card layer, and a fabric layer. The fabric layer may be fastened between the first card layer and the second card layer by one or more connecting components and may be exposed through the first cutout. The authentication card may further include a microchip provided on the first card layer, wherein the microchip is coupled with an antenna enabling contactless authentication by employing radio frequency identification (RFID) or near field communication (NFC). For example, chip-embedded authentication cards coupled with antennas can enable contactless authentication by employing radio frequency identification (RFID) or near field communication (NFC).

In some examples, the first card layer further may include a first plurality of apertures, and the fabric layer may include a second plurality of apertures and wherein the one or more connecting components are inserted through the first plurality of apertures and the second plurality of apertures to fasten the fabric layer between the first card layer and the second card layer. For example, the connecting components may include rivets or stitches to fasten the fabric layer between the first card layer and the second card layer. The rivets can secure the fabric layer between the first card layer and the second card layer by insertion through apertures.

In some examples, the fabric layer can further comprise one or more apertures through which a surface of the first card layer and a surface of the second card layer are bound together by heat treatment. For example, the fabric layer may include one or more apertures through which a surface of a first card layer and a surface of the second card layer are bound together by heat treatment. For example, a method for binding the two surfaces may include heating the two card layers (e.g., the whole card layer, or an area localized to the surfaces to be bound) and cooling the layers at a controlled rate to cause a strong bond between the substrates of the card layers. In some examples, the heat treatment process may also include applying pressure to the card layers. If the card layers include metal, the heat treatment process may include brazing. In some examples, the heat treatment process may include welding, soldering and adhesive bonding.

One or more cutouts in the first or second card layer can have identical or different dimensions. The fabric layer can comprise one or more layers of fabric material comprising microfiber cloth, spandex, denim, leather, muslin, velvet, flannel, felt, corduroy, cotton, satin, wool, another fabric material, or a combination thereof. One or more layers of fabric material can comprise the microfiber cloth. The one or more cutouts can have one or more patterns of a design or brand logo of a co-branded entity. The authentication card can further comprise authentication information on a first exposed surface or a second exposed surface of the authentication card. The authentication card can further comprise a magnetic stripe on the second exposed surface, wherein the magnetic stripe can be parallel to a widthwise edge or a lengthwise edge of the authentication card.

In some embodiments, a method of producing an authentication card is provided. The method can comprise removing a portion of substrate from a first card layer to obtain a first cutout and fastening a fabric layer between the first card layer and a second card layer, wherein the fabric layer is exposed through the first cutout. The method may further comprise embedding a microchip into the first card layer or the second card layer and printing authentication information on an exposed surface of the authentication card.

In some examples, the method can further comprise providing a first plurality of apertures on the first card layer and a second plurality of apertures on the fabric layer and inserting one or more connecting components (e.g., rivets, stitches, thread, etc.) through the first plurality of apertures and the second plurality of apertures to fasten the fabric layer between the first card layer and the second card layer. Alternatively, or additionally, the method can further include providing one or more apertures on the fabric layer through which a surface of the first card layer and a surface of the second card layer are in contact and applying pressure and heat to bind the surface of the first card layer with the surface of the second card layer through the one or more apertures in the fabric layer.

Removing the portion of substrate from the first card layer to obtain the first cutout may include cutting one or more patterns of a design or brand logo of a co-branded entity. Embedding the microchip may include inserting the microchip on an exposed surface of the authentication card. The method can also further comprise placing a magnetic stripe on an exposed surface parallel to a widthwise edge or a lengthwise edge of the authentication card.

According to yet another embodiment, an authentication card apparatus is provided. The authentication card apparatus can comprise a first card layer fastened to a second card layer comprising one or more cutouts in the first card layer or the second card layer, and a fabric layer fastened between the first card layer and the second card layer, wherein the fabric layer is exposed through the one or more cutouts. The authentication card apparatus may further include a microchip provided on an exposed surface of the first card layer or second card layer, wherein the microchip is coupled with an antenna enabling authentication by employing radio frequency identification (RFID) or near field communication (NFC) and authentication information provided on the exposed surface of the first card layer or second card layer of the authentication card apparatus. In some examples, the card may further include one or more apertures provided on the fabric layer, through which a surface of the first card layer and a surface of the second card layer are bound together by heat treatment.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

Figure 1:
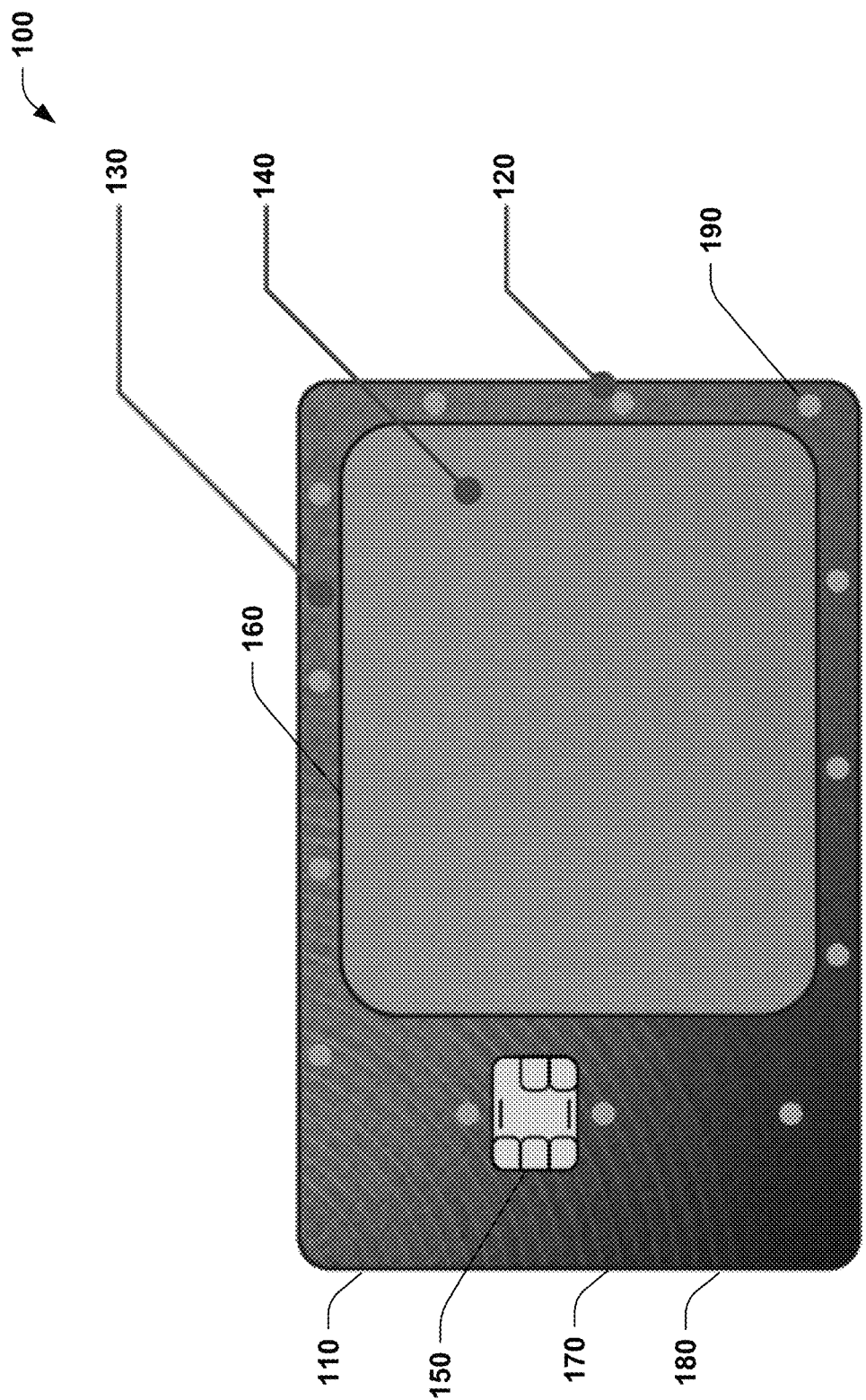
FIG. 1 illustrates a front view of an authentication card fastened with rivets in accordance with one or more embodiments described herein.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Physical impurities and contaminants such as oils, bacteria and dust can cause deterioration and defective functionality in authentication cards and screens such as those on mobile devices. Sanitizing authentication cards or mobile devices using disinfectants and other harsh chemicals is damaging to the function of such items and is also inconvenient. A properly cleaned mobile device can remove the build-up of oil and grime, extending its use and longevity as well as helping prevent illnesses. Certain viruses are known to live as long as nine days on the surface of a smartphone. Cleaning a smartphone can take less than a minute. On average, a person checks their smartphone dozens of times daily, making it a host for germs and viruses. It can be beneficial to figure out a way to encourage people to clean their smartphones more frequently. However, this minor chore can often be overlooked partly due to the inconvenience of not having a cleaning cloth on hand.

Accordingly, a mechanism is desired that would enable individuals or entities to easily clean and remove physical impurities and contaminants. Authentication cards (e.g., payment cards, credit cards, and debit cards) are conventionally made of laminated layers of plastics and used as an electronic payment method. Many people carry with them one or more authentication cards wherever they go. The accessibility of a person's authentication card can make it convenient for the person to use it if it has another purpose (e.g., utility).

As such, one mechanism to allow convenient removal of physical impurities and contaminants includes a proximate fabric (e.g., microfiber) provided in an authentication card. In particular, by providing a fabric layer fastened to one or more card layers of an authentication card, a user may easily remove oils, bacteria, and dirt from other authentication cards in a user's possession.

Embodiments herein disclose an authentication card with an integrated cloth that can be used for cleaning items such as, but not limited to, smartphones (e.g., mobile phones, mobile devices, electronic devices). Smartphones can be frequently used throughout the day, collecting oil, grime, germs, and viruses, among other things. Consequently, it would be beneficial to have a cleaning cloth on hand that is as accessible as an authentication card.

In order to have the largest surface area of cloth available on both sides of an authentication card, the magnetic stripe can be arranged to be parallel along the widthwise edge (e.g., short edge) of an authentication card. Tests have shown that a shorter magnetic stripe does not affect the functionality of the magnetic stripe. However, it is noted that an authentication card does not need to have a magnetic stripe as the embedded chip can provide the same function as a magnetic stripe and with added security.

Considering how readily accessible a person's authentication cards are to them and how often these authentication cards are used, there may be interest in having innovative authentication card designs that stand out from the conventional laminated layers of plastics. For a cardholder, this opens up opportunities to personalize their authentication card designs. Companies (e.g., entities, co-branded entities) can utilize demands for customized authentication card designs to co-brand with financial institutions that issue these authentication cards to place their brand logos on the authentication cards. This can be a strategic marketing partnership for the benefit of both or all parties.

In some embodiments, an authentication card may be a card configured to perform authentication. For example, an authentication card may be a transaction card, which may be used to perform transactions (e.g., contactless transactions) between users and entities. In one example, the authentication card could be a credit card configured to allow credit card transactions.

Additionally or alternatively, the authentication card may be a physical card including a means for short-range communication. For example, a user may hold their authentication card to a reader (e.g., contactless reader). The contactless reader may securely receive card information, such as via radio frequency identification (RFID) or near field communication (NFC) protocols. The card information may then be used to securely authenticate the user or card. The merchant's point-of-sale system may then transmit the transaction to the card issuer, which may analyze the transaction and subsequently approve or deny the transaction.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Referring initially to FIG. 1, a front view 100 is provided of an authentication card 110 fastened with rivets 120. The authentication card 110 can have an authentication card body 130, a fabric layer 140, chip 150 (e.g., microchip, embedded chip, embedded microchip, EMV (Europay, MasterCard®, and Visa®) chip), first design cutout 160 (e.g., rectangular cutout), a first card layer 170 (e.g., first plastic layer, first metal layer), a front side 180 (e.g., first exposed surface), and apertures 190 (e.g., cutouts). The chip 150 can be inserted into the first card layer 170 on the front side 180 of the authentication card 110, and the chip 150 can be coupled with an antenna (not shown) to enable contactless authentications utilizing radio frequency identification (RFID) or near field communication (NFC).

Figure 2:
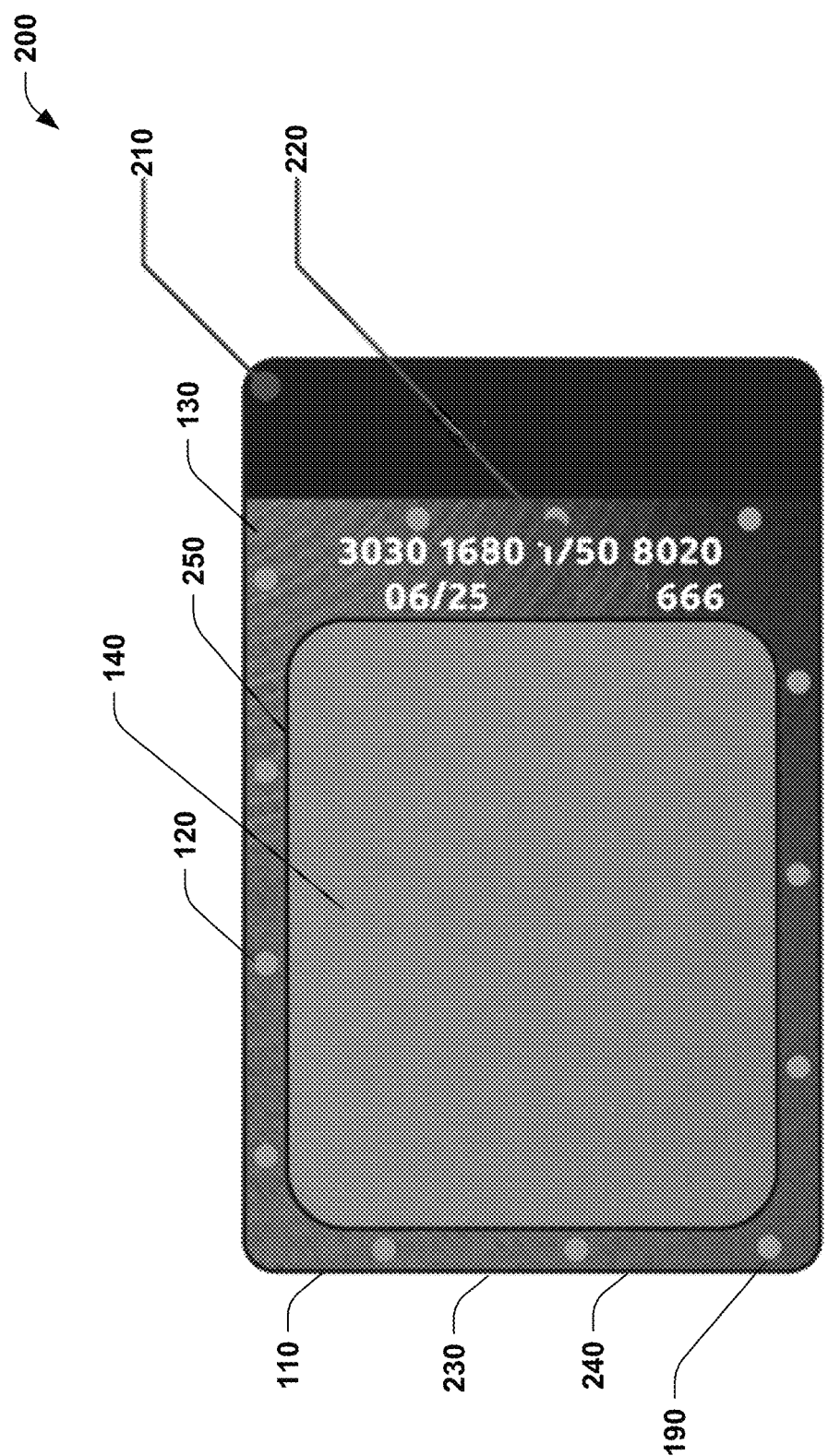
FIG. 2 illustrates a back view of an authentication card fastened with rivets in accordance with one or more embodiments described herein.

Although in this non-limiting example, as shown in FIG. 1, the rivets 120 are used to fasten the fabric layer 140 (e.g., cloth layer, fabric material layer, integrated microfiber cloth, integrated microfiber material) between the first card layer 170 and the second card layer 230 (as shown in FIG. 2), heat treatment, adhesives, or stitches can also be employed to fasten the layers (e.g., generally, the first card layer 170, the fabric layer 140, or the second card layer 230).

The rivets 120 can secure the fabric layer 140 between the first card layer 170 and the second card layer 230 through the apertures 190 (e.g., cutouts). The rivets 120 can be combined with other fastening methods described herein to bind the layers together. It is contemplated that the apertures 190 can be created by different means such as, but not limited to, cutting out or punching out the apertures 190 in the first card layer 170 and the second card layer 230 individually, together, or with the fabric layer 140 inserted between. As another non-limiting example, the apertures 190 can also be formed by injection molding. The first card layer 170 and the second card layer 230 can be formed by injection molding with the apertures 190 as part of the injection mold design. Depending on the size of the rivets 120 and the type of material the fabric layer 140 is made of, the apertures 190 can be formed in the fabric layer 140, prior to inserting the rivets 120 or the apertures 190, by puncturing with the rivets 120. The apertures 190 can be formed in the fabric layer 140 by any number of methods such as, but not limited to, cutting. The apertures 190 can be of different sizes or shapes, having the same shape and a similar dimension as the rivets 120. The apertures 190 can be the same size or slightly smaller than the rivets 120 so that the rivets 120 can fit securely (e.g., tightly) into the apertures 190.

In other embodiments, heat treatment can bind the first card layer 170 to the second card layer 230. The apertures 190 can be created in the fabric layer 140 and not in the first card layer 170 or the second card layer 230. These apertures 190 in the fabric layer 140 can be cutouts of different shapes and sizes. The clearance between the first card layer 170 and the second card layer 230 created by the apertures 190 in the fabric layer 140 can allow the first card layer 170 and the second card layer 230 to be in direct contact with one another. The direct contact between the first card layer 170 and the second card layer 230 can allow these layers to bind together by means of heat treatment.

In yet another embodiment, adhesives can also bind the layers together to form the authentication card 110 without needing to have the apertures 190 in any of the layers. However, the apertures 190 can be formed to use for fastening in conjunction with other methods of fastening the layers together. Any methods of fastening the layers described herein, or a combination thereof, can be utilized to fasten the layers.

It is contemplated that the fabric layer 140 can but does not have to extend to the edges of the authentication card 110. For example, the fabric layer 140 can extend far enough so the rivets 120 can secure the fabric layer 140 between the first card layer 170 and the second card layer 230. Further, the fabric layer 140 can be secured over the first card layer 170 or the second card layer 230. However, the edges of the fabric layer 140 would need protection from getting frayed or peeling off from the authentication card body 130.

As described herein, the fabric layer 140 can have one or more layers of fabric material comprising fabrics such as, but not limited to, microfiber cloth, spandex, denim, leather, muslin, velvet, flannel, felt, corduroy, cotton, satin, wool, another fabric material, or a combination thereof. Furthermore, the fabric layer 140 can comprise microfiber cloth so that the fabric layer 140 can be used to clean electronic devices. The fabric layer 140 can also be made of spandex for its elasticity and case of stretching against an electronic device for cleaning. Although a microfiber cloth may not be as stretchy, it can have many advantages. To compensate for its lack of stretchiness as compared to spandex, it is contemplated that the microfiber cloth can be secured into the authentication card body 130 not as taut and provide some slack so that the microfiber cloth (e.g., fabric layer 140) can be pushed out and pressed against a mobile device for cleaning. The advantages of using a microfiber cloth for cleaning are many. Microfiber cloths can be thin, soft, absorbent, washable, reusable, and effective in cleaning hard surfaces and oleophobic screens of mobile devices. Microfiber cloths can be used damp or dry and with or without a mild specialty cleaning solution for electronic screens.

The fabric layer 140 can be secured into the authentication card body 130 and exposed through the first design cutout 160 or the second design cutout 250 (e.g., collectively, the first design cutout 160 or second design cutout 250), as shown in FIG. 2. For example, the fabric layer 140 can be exposed through the first design cutout 160 (e.g., rectangular cutout or another pattern of cutout) in the first card layer 170 or through the second design cutout 250 (e.g., rectangular cutout or another pattern of cutout) in the second card layer 230. The first design cutout 160 and the second design cutout 250 can be apertures (e.g., design apertures) and have the same shape and dimension and align with one another, as shown in FIGS. 1 and 2. The authentication card body 130 can also have either the front side 180 or the backside 240 (see, e.g., FIG. 2) with a design cutout, leaving the other side solid without any design cutouts and the fabric layer 140 exposed on one side of the authentication card 110. However, that would make cleaning difficult if one side of the authentication card body 130 does not have any design cutout (e.g., rectangular cutouts) because flexibility would decrease significantly. Similarly, if the first design cutout 160 or the second design cutout 250 is narrow or small, the case of usage for cleaning can also be decreased.

Besides using the fabric layer 140 for cleaning, the fabric layer 140 can also be used for design purposes or to display a brand logo of a co-branded entity. As such, the first design cutout 160 or the second design cutout 250 can form different shapes (e.g., patterns or designs) or the pattern of a brand logo. The fabric layer 140 can be exposed through the first design cutout 160 or the second design cutout 250 to showcase a design or brand logo, and the fabric layer 140 can include embellishments that are sewn on or glued on.

Besides integrating the fabric layer 140, the authentication card body 130 can also be enlivened using different materials to form the first card layer 170 and the second card layer 230. Ordinarily, the first card layer 170 and the second card layer 230 can be made of one or more layers of plastic, such as polyvinyl chloride acetate, commonly known as PVCA or PVC. However, it is appreciated that the first card layer 170 and the second card layer 230 can be made of other materials. For example, the first card layer 170 and the second card layer 230 can be made of metals such as, but not limited to, brass, copper, stainless steel, titanium, gold, palladium, a combination thereof, or a mix of plastic and metal.

FIG. 2 illustrates a back view 200 of the authentication card 110 fastened with the rivets 120. The back view 200 of the authentication card 110 can include a magnetic stripe 210, authentication information 220 (e.g., card information), second card layer 230, backside 240 (e.g., second exposed surface), and second design cutout 250. As shown in FIG. 2, the rivets 120 can be seen as fitting inside the apertures 190 along the backside 240 of the authentication card 110 opposite the front side 180.

The magnetic stripe 210 can be placed on the second card layer 230 and positioned on the backside 240 of the authentication card 110, wherein the magnetic stripe 210 can be parallel to a widthwise edge (e.g., short side) or a lengthwise edge (e.g., long side). It is contemplated, and as shown in FIG. 2, that by placing the magnetic stripe 210 on the widthwise edge (e.g., short side) of the authentication card 110, the second design cutout 250 can be larger, exposing more surface area of the fabric layer 140, which can be especially useful if the integrated fabric material is intended to be used for cleaning electronic devices. This change in the orientation of the magnetic stripe 210, customarily on the long side of an authentication card, to be on the short side of an authentication card (e.g., authentication card 110) has no impact on its function. A shortened magnetic stripe can work as well as a standard-length magnetic stripe. In addition, having the magnetic stripe 210 can be optional because payment authentications are increasingly reliant on EMV chips (e.g., chip 150).

The authentication information 220 can include a card number, expiration date, CVC code (Card Verification Code), and the cardholder's name (not shown). The authentication information 220 (e.g., payment information) can be placed either on the front side 180 or the backside 240 of the authentication card 110, although there can be benefits to displaying the authentication information 220 on the backside 240. By placing the authentication information 220 on the backside 240, the front side 180 can have a larger uninterrupted surface area for other displays or designs. In addition, security can be improved by placing the authentication information 220 on the backside 240 of the authentication card 110 because it would be less visible to other people. There could also be space-saving advantages to placing the authentication information 220 along the widthwise edge, similar to the placement of the magnetic stripe 210, as illustrated in FIG. 2.

Figure 3:
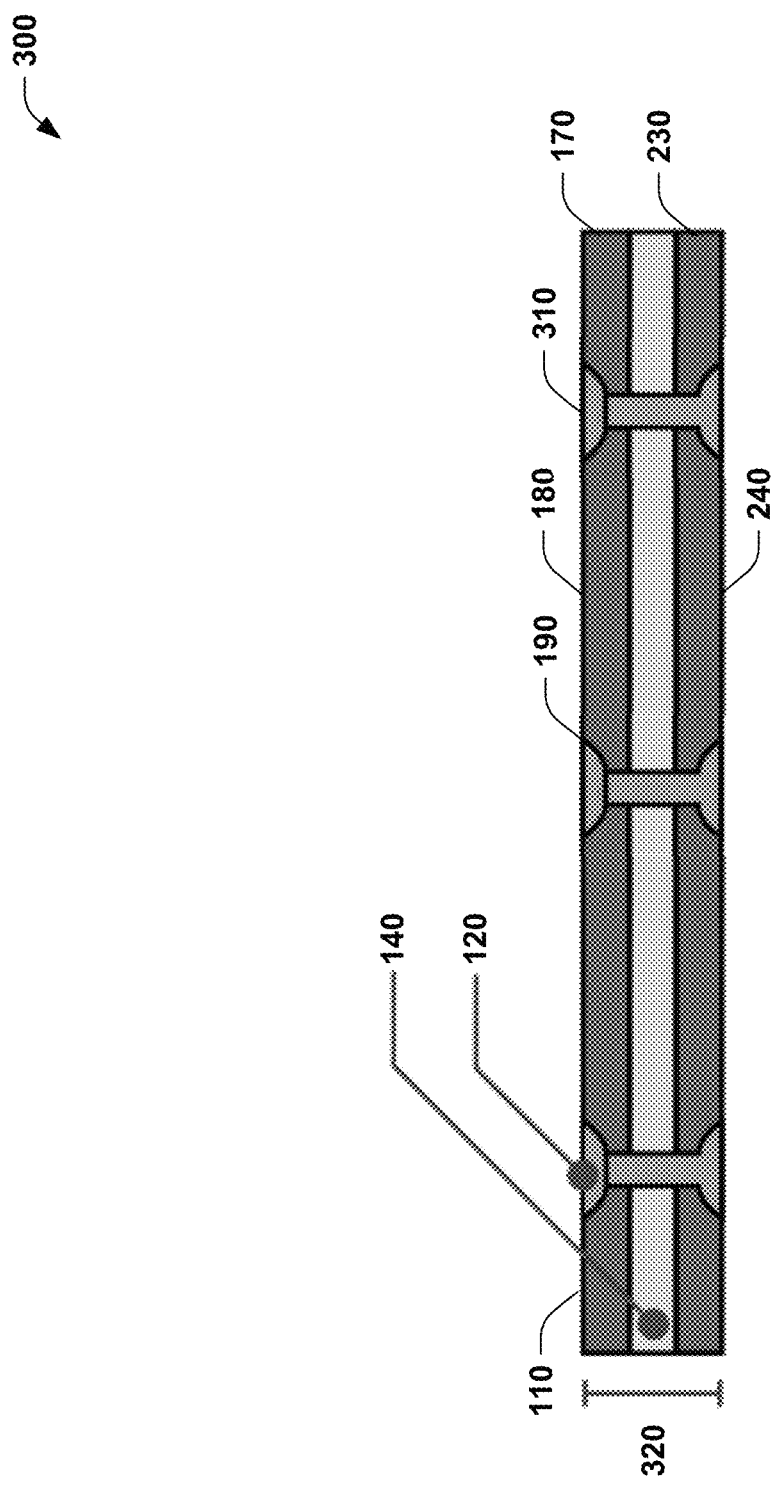
FIG. 3 illustrates a cross-section depicting the rivets fastening a fabric layer between card layers in accordance with one or more embodiments described herein.

Moving to FIG. 3, a cross-section 300 is illustrated depicting the rivets 120 fastening the fabric layer 140 between card layers, e.g., the first card layer 170 and the second card layer 230. It can be desirable for the rivets 120 to have a flat, solid head such as, but not limited to, head 310 so that the surface of the rivets 120 is flush with the surface of the authentication card 110 without needing additional steps. However, the rivets 120 can have a different shape and dimension than the non-limiting example depicted in FIG. 3. The rivets 120 can fit inside the apertures 190 to bind the first card layer 170, the fabric layer 140, and the second card layer 230 together. The first card layer 170 can be on the front side 180 (e.g., first exposed surface) of the authentication card 110. The second card layer 230 can be on the backside 240 (e.g., second exposed surface) of the authentication card 110. In the cross-section 300, the fabric layer 140 can be seen as inserted between the first card layer 170 and the second card layer 230.

The authentication card 110 can have a thickness 320, which can be the standard authentication card thickness of 0.76 millimeters (mm). The thickness of the layers can depend on the thickness of the other layers. Depending on the thickness of the fabric layer 140, the thickness of the first card layer 170 and the second card layer 230 can be adjusted accordingly. The first card layer 170, and similarly, the second card layer, can comprise one or more layers of plastic, metals, or a combination thereof. Likewise, the fabric layer can be comprised of one or more layers of fabric material.

Figure 4:
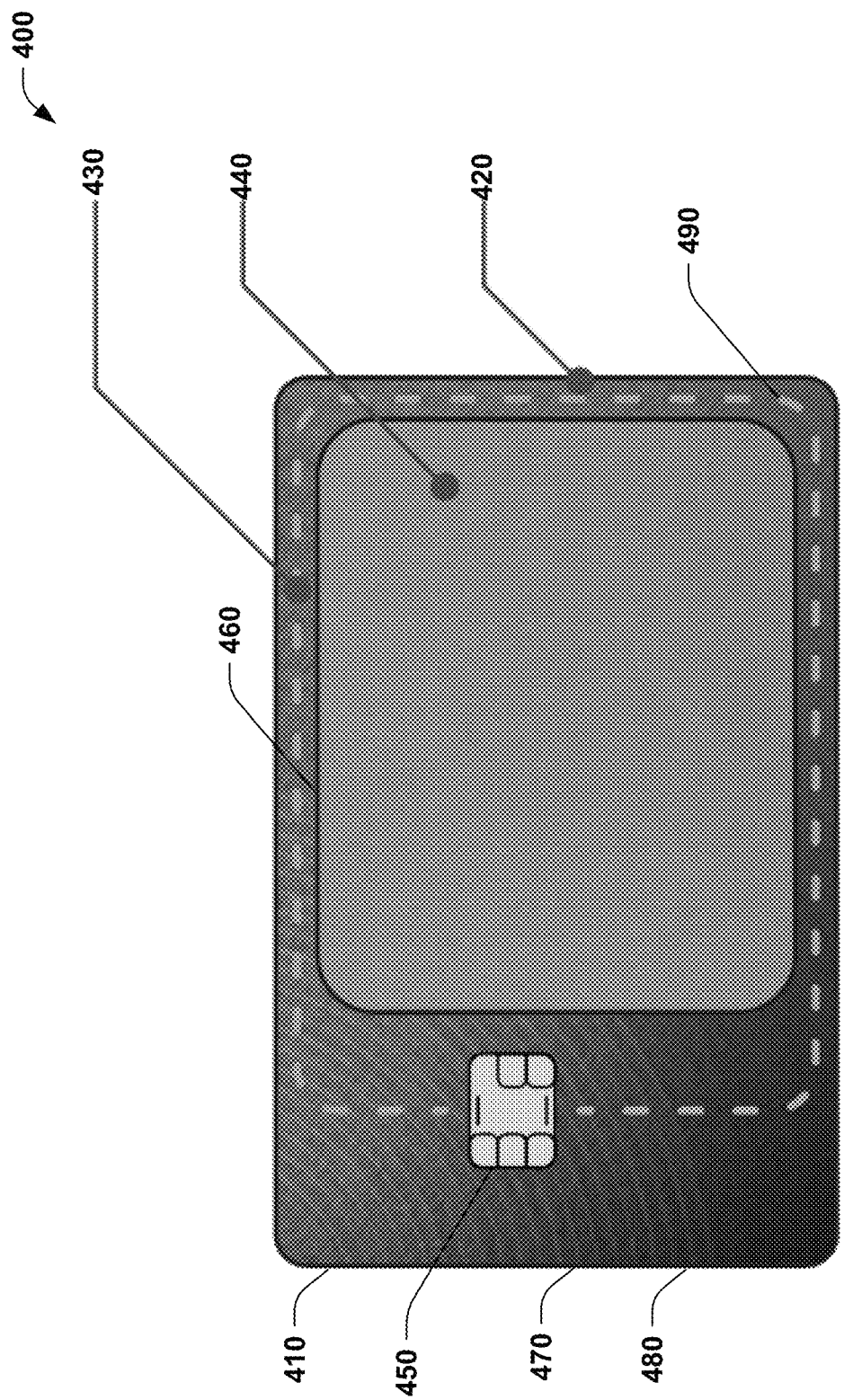
FIG. 4 illustrates a front view of an authentication card fastened with stitches in accordance with one or more embodiments described herein.
Figure 5:
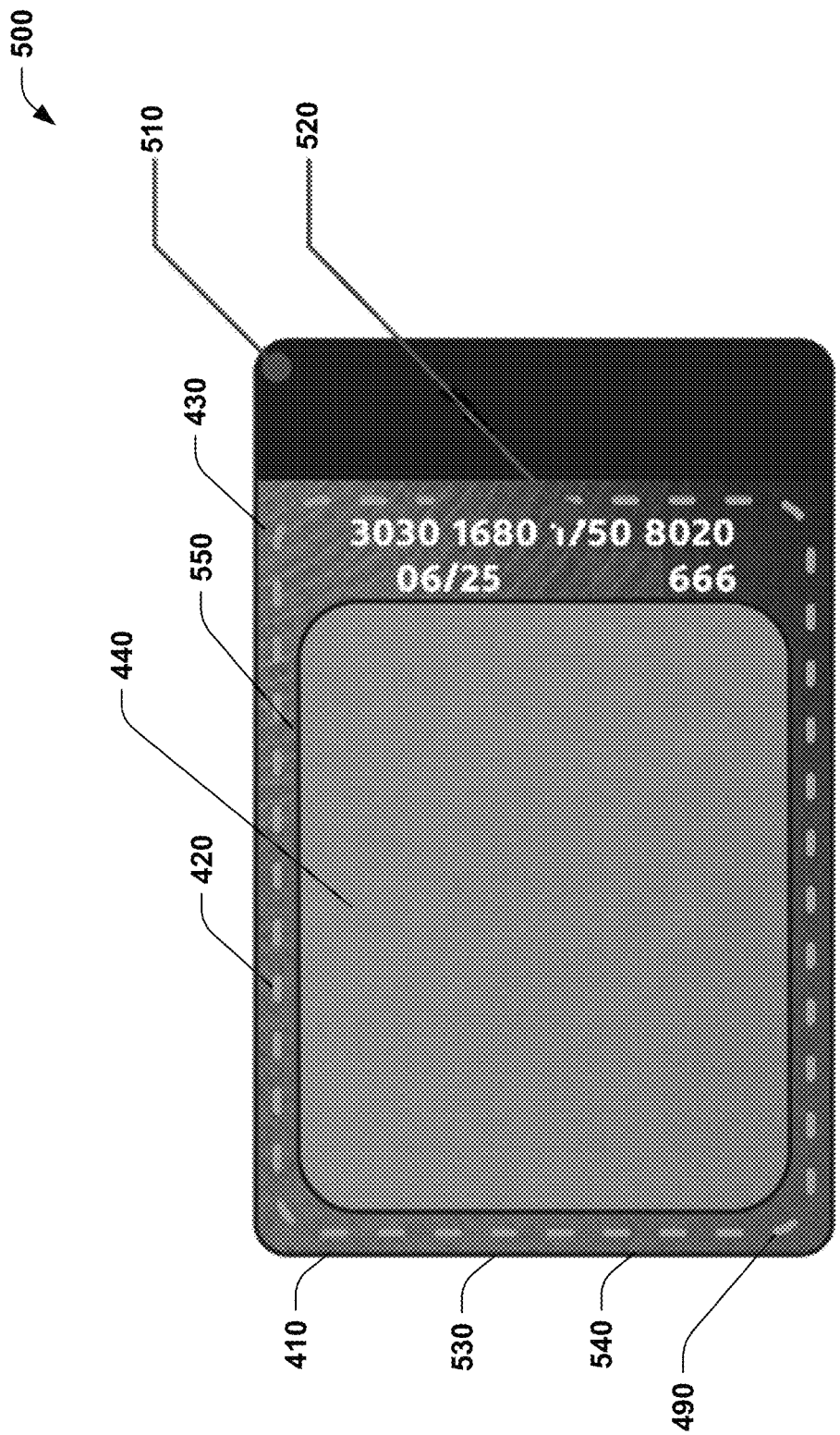
FIG. 5 illustrates a back view of an authentication card fastened with stitches in accordance with one or more embodiments described herein.

As disclosed previously, stitches can also be used to fasten an authentication card with an integrated cloth. FIG. 4 illustrates a non-limiting example embodiment of an authentication card employing stitches to fasten a cloth layer between card layers. FIG. 4 illustrates a front view 400 of an authentication card 410 fastened with stitches 420. The authentication card 410 can comprise an authentication card body 430, a fabric layer 440, chip 450 (e.g., microchip, embedded chip, embedded microchip, EMV chip), first design cutout 460 (e.g., rectangular cutout), a first card layer 470 (e.g., first plastic layer, first metal layer), a front side 480 (e.g., first exposed surface), and apertures 490 (e.g., cutouts). The chip 450 can be embedded into the first card layer 470 on the front side 480 of the authentication card 410. For design purposes, the chip 450 can also be placed on a backside 540 (e.g., second exposed surface) of the authentication card 410. For example, FIG. 5 illustrates the backside 540 of the authentication card 410. The chip 450 can be coupled with an antenna (not shown) to enable contactless authentications utilizing radio frequency identification (RFID) or near field communication (NFC).

The stitches 420 can be used to sew (e.g., fasten, secure, bind, attach) the fabric layer 440 (e.g., cloth layer, fabric material layer, integrated microfiber cloth, integrated microfiber material) between the first card layer 470 and the second card layer 530 (as shown in FIG. 5). Besides fastening the first card layer 470, the fabric layer 440, and the second card layer 230 (e.g., collectively, the layers) together, the stitches 420 can also be used to stylize the authentication card 410 by having different types of stitches. The different types of stitches can have different stitching patterns. The stitches 420 can also contour one or more design patterns providing yet another method to stylize the authentication card 410. The stitches 420 can sew the fabric layer 440 to the first card layer 470 or the second card layer 530 or all the layers together because it is contemplated that the stitches 420 can be used in combination with other methods of fastening described herein to bind the layers together. The stitches 420 can be sewn onto the first card layer 470, the fabric layer 440, or the second card layer 530 individually or together for design purposes, while another method or combination of methods of fastening can be used to bind the layers.

The stitches 420 can sew the fabric layer 440 between the first card layer 470 and the second card layer 530 through the apertures 490. It is contemplated that the apertures 490 can be created in the first card layer 470 and the second card layer 530 before sewing the stitches 420 through the authentication card body 430 via the apertures 490. By having pre-formed apertures, the stitches 420 can run through the authentication card body 430 smoothly and cleanly without leaving teared-up material from the punctured layers (e.g., first card layer 470, fabric layer 440, or second card layer 530). The apertures 490 can be created with punctures, and any rough edges (e.g., teared-up material) can be smoothed out prior to assembling and sewing the layers together. The apertures 490 can also be part of an injection molding if the first card layer 470 or the second card layer 530 are created using this method.

Additionally or alternatively, connecting components other than rivets and stitches created using thread may be used. For example, the first card layer may include a first plurality of apertures, and the fabric layer may include a second plurality of apertures. One or more connecting components, such as rivets, stitches, ties, pins, etc. can be inserted through the first plurality of apertures and the second plurality of apertures to fasten the fabric layer between the first card layer and the second card layer. In other examples, any suitable fastening mechanism may be used, including buttons, snaps, zippers, hook and loop fasteners, buckles, clasps, laces, ties, magnets, pins, hooks, rivets, stitches, or adhesives.

Similar to the embodiments described in FIGS. 1-3, it is contemplated that the fabric layer 440 can but does not have to extend to the edges of the authentication card 410. The fabric layer 440 can extend far enough so that there is enough fabric material for the stitches 420 to sew the fabric layer 440 onto or between the first card layer 470 and the second card layer 530. It is further contemplated that the fabric layer 440 can also be secured over the first card layer 470 or the second card layer 530 instead of between these card layers. However, extra care may need to be taken to ensure the fabric layer 440 is securely fastened and flushed with the card layers (e.g., first card layer 470 or second card layer 530).

Again, similar to the embodiments described in FIGS. 1-3, the fabric layer 440 can have one or more layers of fabric material comprising, such as, but not limited to, microfiber cloth, spandex, denim, leather, muslin, velvet, flannel, felt, corduroy, cotton, satin, wool, another fabric material, or a combination thereof. By integrating a microfiber cloth, as the fabric layer 440, into the authentication card 410, the authentication card 410 can be used to clean electronic devices. The fabric layer 440 can also be made of spandex for its elasticity and case of stretching the spandex against an electronic device to clean the electronic device. Although a microfiber cloth (e.g., integrated microfiber cloth, microfiber material, or microfiber fabric) is not as stretchy as compared to spandex, it does have a number of advantages. To compensate for its lack of stretchiness, it is contemplated that the microfiber cloth can be sewn into the authentication card body 130 not as taut so the microfiber cloth (e.g., fabric layer 440) can be pushed out and pressed against a mobile device for cleaning. As described above, there are many advantages of using a microfiber cloth for cleaning. Microfiber cloths can be thin, soft, absorbent, washable, reusable, and effective in cleaning hard surfaces and oleophobic screens of mobile devices. Microfiber cloths can be used damp or dry and with or without a mild specialty cleaning solution for electronic screens.

The fabric layer 440 can be sewn into the authentication card body 430 and exposed through the first design cutout 460 or second design cutout 550 (e.g., collectively, first design cutout 460 and second design cutout 550, rectangular cutouts, or design apertures), as shown in FIG. 2. For example, the fabric layer 440 can be exposed through the first design cutout 460 in the first card layer 470 or through the second design cutout 550 (e.g., rectangular cutout) in the second card layer 530. The first design cutout 460 and the second design cutout 550 can have the same shape and dimension and align with one another, as shown in FIGS. 4 and 5. The authentication card body 430, thus, can have the first design cutout 460 or the second design cutout 550, which the fabric layer 440 can be exposed through. For purposes of using the fabric layer 440 as a cleaning cloth, the fabric layer 440 can be more easily accessed and used for cleaning if the authentication card body 430 has both the first design cutout 460 and the second design cutout 550, rather than having a design cutout on one side and none on the other side. Similarly, if the first design cutout 460 or the second design cutout 550 is narrow or small, the case of usage of the fabric layer 440 for cleaning can also be decreased.

The fabric layer 440 can also be used to showcase a design pattern or to display a brand logo of a co-branded entity. As such, the first design cutout 460 or the second design cutout 550 can form different shapes (e.g., designs, patterns, design patterns) or the shape of one or more brand logos. The fabric layer 440 can be exposed through the first design cutout 460 or the second design cutout 550 to display one or more design patterns or brand logos, and the fabric layer 440 can include sewn-in or glued-on embellishments.

The authentication card 410 can also be enlivened using different materials to form the authentication card body 430. Ordinarily, the first card layer 470 and the second card layer 530, forming the authentication card body 430, can be made of one or more layers of plastic, such as polyvinyl chloride acetate, commonly known as PVCA or PVC. However, it is appreciated that the first card layer 470 and the second card layer 530 can be made of other materials. For example, the first card layer 470 and the second card layer 530 can be made of metals such as, but not limited to, brass, copper, stainless steel, titanium, gold, palladium, a combination thereof, or a mix of plastic and metal.

FIG. 5 illustrates a back view 500 of an authentication card 410 fastened with the stitches 420. The back view 500 of the authentication card 410 can also include a magnetic stripe 510, payment information 520 (e.g., card information), second card layer 530, backside 540 (e.g., second exposed surface), and the second design cutout 550. The magnetic stripe 510 can be placed on the second card layer 530 and positioned on the backside 540 of the authentication card 410, wherein the magnetic stripe 510 can be parallel to a widthwise edge (e.g., short side) or a lengthwise edge (e.g., long side) of the authentication card 410. As shown in FIG. 5, by placing the magnetic stripe 510 on the widthwise edge of the authentication card 410, the second design cutout 550 can be wider (e.g., larger), which translates into a fabric layer 440 exposed that is larger through the first design cutout 460 and second design cutout 550. An increase in a continuous exposed surface of the fabric layer 440 means it can be more easily accessible for use as a cleaning cloth. The shortening of the magnetic stripe 510 by changing the orientation of the magnetic stripe 510 from the long side of an authentication card to the short side of the authentication card 410 has no impact on its function.

Figure 6:
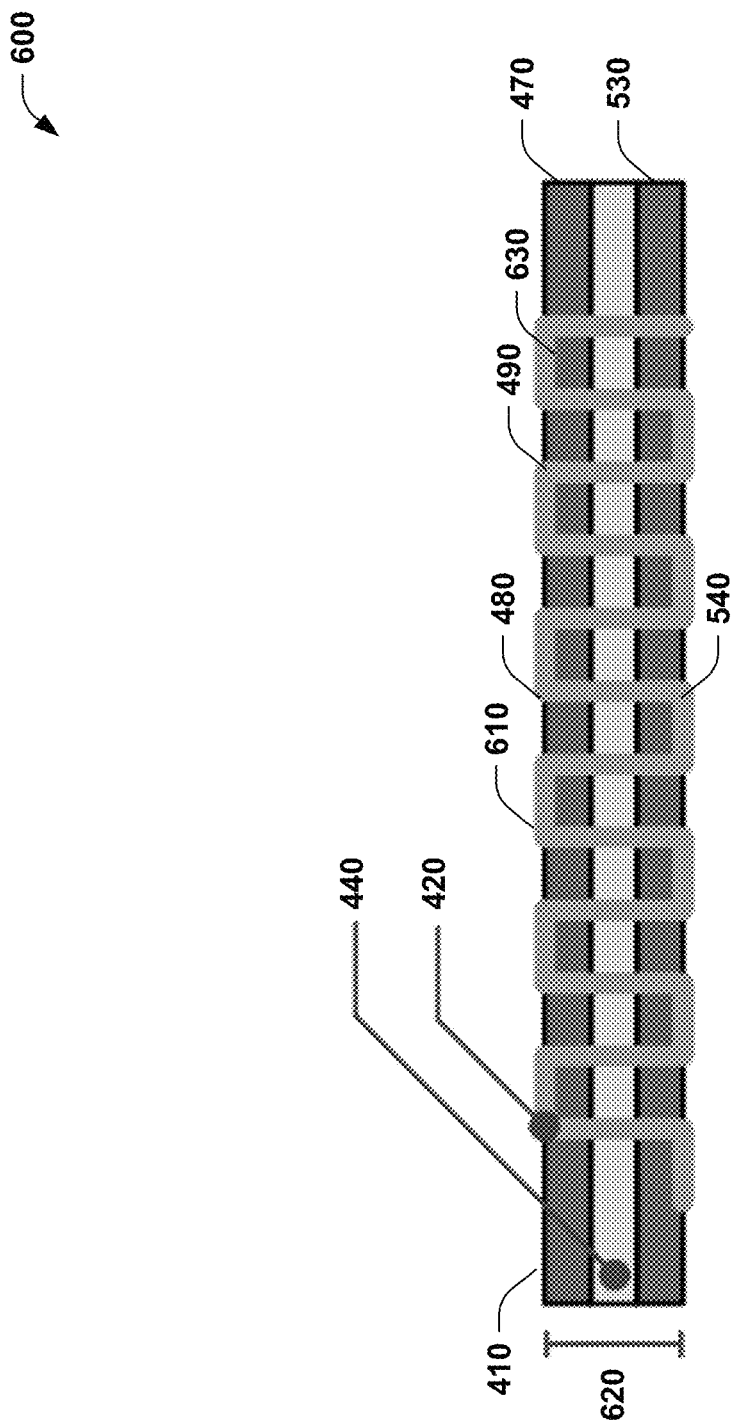
FIG. 6 illustrates a cross-section depicting the stitches fastening a fabric layer between card layers in accordance with one or more embodiments described herein.

FIG. 6 illustrates a cross-section 600 depicting the stitches 420 fastening the fabric layer 440 between the first card layer 470 and the second card layer 530 (e.g., collectively, the card layers). Described differently, the cross-section 600 depicts the stitches 420 sewing the fabric layer 440 together between the first card layer 470 and the second card layer 530. Similar to the authentication card 110, the authentication card 410 can have a thickness 620 measured at a standard authentication card thickness of 0.76 millimeters (mm).

Thread 610 can be seen running through the apertures 490 to create the stitches 420. Depending on the thickness of the thread 610 and style of stitches, it is contemplated that the thickness of the layers can compensate for the thickness of the thread 610. For example, in order to maintain the standard authentication card thickness throughout the authentication card 410, it is contemplated that indentations 630 can be made in the front side 480 (e.g., first exposed surface) of the first card layer 470 or in the backside 540 (e.g., second exposed surface) of the second card layer 530. This can ensure that the stitches 420 flushes with (e.g., is leveled with) the card layers (e.g., first card layer 470 or second card layer 530). The stitches 420 illustrated here in FIG. 6 is a non-limiting example of a style of stitch that can be used. One or more different styles of stitches can be used to sew the layers together or to provide one or more design patterns. For style and durability, the thread 610 can be made of natural fiber, synthetic fiber, metal, or a combination thereof.

Figure 7:
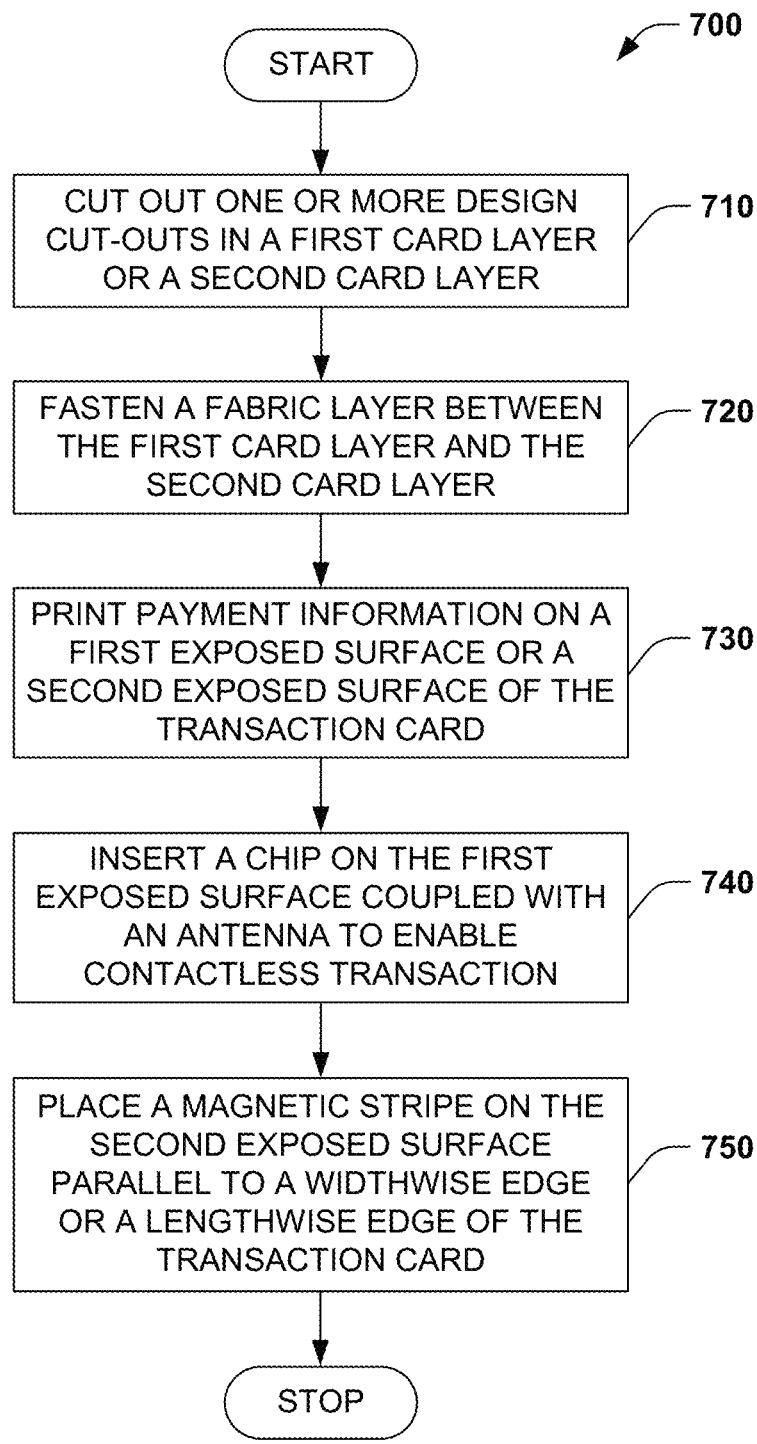
FIG. 7 is a flow chart diagram of a method of producing an authentication card in accordance with one or more embodiments described herein.

FIG. 7 is a flow chart diagram of a method 700 of producing (e.g., constructing) an authentication card (e.g., authentication card 110 or authentication card 410). For brevity, the authentication card 110 and the authentication card 410 are referenced. However, it can be understood that reference numbers in the 100 s through 300 s can correspond to the method 700 of producing the authentication card 110, and reference numbers in the 400 s through 600 s can correspond to the method 700 of producing the authentication card 410. The methods of producing the authentication card 110 and the authentication card 410 can be fundamentally similar except for the possible difference in the type of fastener used. The authentication card 110 can be described as utilizing the rivets 120 as a fastener. However, other fasteners can be employed as a replacement for, in conjunction with, or in combination with the rivets 120. Similarly, the authentication card 410 can be described as utilizing the stitches 420 as a fastener. However, other types of fasteners can be employed in conjunction with or in combination with the stitches 420.

The method 700 of producing an authentication card (e.g., authentication card 110 and authentication card 410) can begin at 710 by cutting out one or more designs in the card layers. More specifically, at 710, the method 700 of producing the authentication card 110 or 410 can comprise cutting out one or more design cutouts or apertures (e.g., rectangular cutouts or first design cutout 460 or second design cutout 550) in a first card layer 170 or 470, or a second card layer 230 or 530. Cutting one or more design cutouts (e.g., first design cutout 460 or second design cutout 550) can comprise removing a portion of substrate from the card layer to obtain the cutout, for example by cutting one or more patterns of a design or brand logo of a co-branded entity.

At 720, the method 700 of producing the authentication card 110 or 410 can comprise fastening the fabric layer 140 or 440 between the first card layer 170 or 470 and the second card layer 230 or 530, wherein the fabric layer 140 or 440 can be exposed through the one or more design cutouts (e.g., first design cutout 460 or second design cutout 550). Fastening the fabric layer can include providing a first plurality of apertures on the first card layer and a second plurality of apertures on the fabric layer and inserting one or more connecting components through the first and second plurality of apertures to fasten the fabric layer between the card layers. As described herein, the connecting components may include rivets, stitches, or any other fasteners. Alternatively or additionally, rather than fastening using connecting components, the method may include providing one or more apertures on the fabric layer through which a surface of the first card layer and a surface of the second card layer are in contact. The method may then include applying pressure and heat to bind (e.g., through the apertures on the fabric layer) the surface of the first card layer with the surface of the second card layer.

The method 700 of producing the authentication card 110 or 410 can further comprise using rivets 120, stitches 420, or adhesive to fasten the fabric layer 140 or 440 between the first card layer 170 or 470 and the second card layer 230 or 530. The method 700 of producing the authentication card 110 or 410 can further comprise inserting the rivets 120 or the stitches 420 in through apertures (e.g., apertures 190 or 490) in the first card layer 170 or 470, the fabric layer 140 or 440, and the second card layer 230 or 530. The method 700 of producing an authentication card 110 or 410 can further comprise applying pressure and heat to fasten the first card layer 170 or 470 with the second card layer 230 or 530 through cutouts (e.g., apertures 190 or 490) in the fabric layer 140 or 440.

At 730, the method 700 of producing an authentication card 110 or 410 can comprise printing the authentication information 220 or payment information 520 on a first exposed surface (e.g., front side 180 or 480) or a second exposed surface (e.g., backside 240 or 540) of the authentication card 110 or 410. At 740, the method 700 of producing the authentication card 110 or 410 can comprise inserting a chip 150 on the first exposed surface (e.g., front side 180 or 480) or the second exposed surface (e.g., backside 240 or 540) coupled with an antenna to enable contactless authentications utilizing radio frequency identification (RFID) or near field communication (NFC). At 750, the method 700 of producing the authentication card 110 or 410 can comprise placing a magnetic stripe 210 or 510 on the second exposed surface (e.g., backside 240 or 540)

parallel to a widthwise edge (e.g., short side) or a lengthwise edge (e.g., long side) of the authentication card 110 or 410.

In some embodiments, the method may also include embedding a microchip into the first or second card layer. The microchip may be coupled with an antenna enabling contactless authentication by employing radio frequency identification (RFID) or near field communication (NFC). In some examples, the microchip may be inserted on an exposed surface of the authentication card (e.g., outward surface of the first or second card layer).

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems or methods described above may be applied to, or used in accordance with, other systems or methods.

The present techniques will be better understood with reference to the following enumerated embodiments:

A1. An authentication card for short range wireless communications, the authentication card comprising: a first card layer comprising a first cutout; a second card layer; a fabric layer fastened between the first card layer and the second card layer by one or more connecting components, wherein the fabric layer is exposed through the first cutout; and a microchip provided on the first card layer, wherein the microchip is coupled with an antenna enabling contactless authentication by employing radio frequency identification (RFID) or near field communication (NFC).

A2. The authentication card of any of the preceding embodiments, wherein the first card layer further comprises a first plurality of apertures, and the fabric layer comprises a second plurality of apertures and wherein the one or more connecting components are inserted through the first plurality of apertures and the second plurality of apertures to fasten the fabric layer between the first card layer and the second card layer.

A3. The authentication card of any of the preceding embodiments, wherein the one or more connecting components comprise rivets or stitches.

A4. The authentication card of any of the preceding embodiments, wherein the fabric layer further comprises one or more apertures through which a surface of the first card layer and a surface of the second card layer are bound together by heat treatment.

A5. The authentication card of any of the preceding embodiments, wherein the second card layer comprises a second cutout, and wherein the first cutout and the second cutout have identical dimensions.

A6. The authentication card of any of the preceding embodiments, wherein the second card layer comprises a second cutout, and wherein the first cutout and the second cutout have different dimensions.

A7. The authentication card of any of the preceding embodiments, wherein the fabric layer comprises one or more layers of fabric material comprising microfiber cloth, spandex, denim, leather, muslin, velvet, flannel, felt, corduroy, cotton, satin, wool, other fabric material, or a combination thereof.

A8. The authentication card of any of the preceding embodiments, wherein the first cutout comprises one or more patterns of a design or brand logo of a co-branded entity.

A9. The authentication card of any of the preceding embodiments, further comprising authentication information on a first exposed surface or a second exposed surface of the authentication card.

A10. The authentication card of any of the preceding embodiments, wherein the microchip is inserted on the first exposed surface or the second exposed surface.

A11. The authentication card of any of the preceding embodiments, further comprising a magnetic stripe on the second exposed surface, wherein the magnetic stripe is parallel to a widthwise edge of the authentication card.

A12. A method of producing an authentication card of any of the embodiments of A1-A11.

A13. An authentication card apparatus, comprising: a first card layer fastened to a second card layer comprising one or more cutouts in the first card layer or the second card layer; a fabric layer fastened between the first card layer and the second card layer, wherein the fabric layer is exposed through the one or more cutouts; a microchip provided on an exposed surface of the first card layer or second card layer, wherein the microchip is coupled with an antenna enabling authentication by employing radio frequency identification (RFID) or near field communication (NFC); and authentication information provided on the first exposed surface or the second exposed surface of the authentication card apparatus.

A14. The authentication card apparatus of any of the preceding embodiments, further comprising one or more apertures provided on the fabric layer, through which a surface of the first card layer and a surface of the second card layer are bound together by heat treatment.

B1. A transaction card, comprising: a first card layer; a second card layer; and a fabric layer fastened between the first card layer and the second card layer, wherein the fabric layer is exposed through one or more design cutouts in the first card layer or the second card layer.

B2. The transaction card of any one of the preceding embodiments, further comprising rivets, stitches, or adhesive to fasten the fabric layer between the first card layer and the second card layer.

B3. The transaction card of any one of the preceding embodiments, wherein the rivets secure the fabric layer between the first card layer and the second card layer by insertion through apertures.

B4. The transaction card of any one of the preceding embodiments, wherein the fabric layer further comprises cutouts so the first card layer and the second card layer bind together through these cutouts by heat treatment.

B5. The transaction card of any one of the preceding embodiments, wherein the one or more design cutouts in the first card layer or the second card layer have identical or different dimensions.

B6. The transaction card of any one of the preceding embodiments, wherein the fabric layer comprises one or more layers of fabric material comprising microfiber cloth, spandex, denim, leather, muslin, velvet, flannel, felt, corduroy, cotton, satin, wool, another fabric material, or a combination thereof.

B7. The transaction card of any one of the preceding embodiments, wherein the one or more layers of fabric material comprises the microfiber cloth.

B8. The transaction card of any one of the preceding embodiments, wherein the one or more design cutouts have one or more patterns of a design or brand logo of a co-branded entity.

B9. The transaction card of any one of the preceding embodiments, further comprising payment information on a first exposed surface or a second exposed surface of the transaction card.

B10. The transaction card of any one of the preceding embodiments, further comprising a chip inserted on the first exposed surface or the second exposed surface coupled with an antenna to enable contactless transactions utilizing radio frequency identification (RFID) or near field communication (NFC).

B11. The transaction card of any one of the preceding embodiments, further comprising a magnetic stripe on the second exposed surface, wherein the magnetic stripe is parallel to a widthwise edge of the transaction card.

B12. A method of producing an authentication card of any of the embodiments of B1-B11.

B13. A payment card apparatus, comprising: a first card layer fastened to a second card layer comprising one or more design apertures in the first card layer or the second card layer; a fabric layer fastened between the first card layer and the second card layer, wherein the fabric layer is exposed through the one or more design apertures; and payment information on a first exposed surface or a second exposed surface of the payment card apparatus.

B14. The payment card apparatus of any one of the preceding embodiments, further comprising: a microchip; and an antenna coupled to the microchip to enable contactless transactions utilizing radio frequency identification (RFID) or near field communication (NFC).

What is claimed is:

1. An authentication card for short range wireless communications, the authentication card comprising:
   a first card layer comprising a first cutout;
   a second card layer;
   a fabric layer fastened between the first card layer and the second card layer by one or more connecting components, wherein the fabric layer is physically exposed through the first cutout; and
   a microchip provided on the first card layer, wherein the microchip is coupled with an antenna enabling contactless authentication by employing radio frequency identification (RFID) or near field communication (NFC).

2. The authentication card of claim 1, wherein the first card layer further comprises a first plurality of apertures, and the fabric layer comprises a second plurality of apertures and wherein the one or more connecting components are inserted through the first plurality of apertures and the second plurality of apertures to fasten the fabric layer between the first card layer and the second card layer.

3. The authentication card of claim 2, wherein the one or more connecting components comprise rivets or stitches.

4. The authentication card of claim 1, wherein the fabric layer further comprises one or more apertures through which a surface of the first card layer and a surface of the second card layer are bound together by heat treatment.

5. The authentication card of claim 1, wherein the second card layer comprises a second cutout, and wherein the first cutout and the second cutout have identical dimensions.

6. The authentication card of claim 1, wherein the second card layer comprises a second cutout, and wherein the first cutout and the second cutout have different dimensions.

7. The authentication card of claim 1, wherein the fabric layer comprises one or more layers of fabric material comprising microfiber cloth, spandex, denim, leather, muslin, velvet, flannel, felt, corduroy, cotton, satin, wool, other fabric material, or a combination thereof.

8. The authentication card of claim 1, wherein the first cutout comprises one or more patterns of a design or brand logo of a co-branded entity.

9. The authentication card of claim 1, further comprising authentication information on a first exposed surface or a second exposed surface of the authentication card.

10. The authentication card of claim 9, wherein the microchip is inserted on the first exposed surface or the second exposed surface.

11. The authentication card of claim 9, further comprising a magnetic stripe on the second exposed surface, wherein the magnetic stripe is parallel to a widthwise edge of the authentication card.

12. The authentication card of claim 1, wherein the fabric layer comprises a microfiber material, and wherein the fabric layer is not taut.

13. A method of producing an authentication card comprising:
   removing a portion of substrate from a first card layer to obtain a first cutout;
   fastening a fabric layer between the first card layer and a second card layer, wherein the fabric layer is physically exposed through the first cutout;
   embedding a microchip into the first card layer or the second card layer; and
   printing authentication information on an exposed surface of the authentication card.

14. The method of claim 13, further comprising:
   providing a first plurality of apertures on the first card layer and a second plurality of apertures on the fabric layer; and
   inserting one or more connecting components through the first plurality of apertures and the second plurality of apertures to fasten the fabric layer between the first card layer and the second card layer.

15. The method of claim 14, wherein the one or more connecting components comprise rivets or stitches.

16. The method of claim 13, further comprising:
   providing one or more apertures on the fabric layer through which a surface of the first card layer and a surface of the second card layer are in contact; and
   applying pressure and heat to bind the surface of the first card layer with the surface of the second card layer through the one or more apertures in the fabric layer.

17. The method of claim 13, wherein embedding the microchip comprises inserting the microchip on an exposed surface of the authentication card.

18. The method of claim 13, further comprising placing a magnetic stripe on an exposed surface parallel to a widthwise edge of the authentication card.

19. An authentication card apparatus, comprising:
   a first card layer fastened to a second card layer comprising one or more cutouts in the first card layer or the second card layer;
   a fabric layer fastened between the first card layer and the second card layer, wherein the fabric layer is physically exposed through the one or more cutouts;
   a microchip provided on an exposed surface of the first card layer or second card layer, wherein the microchip is coupled with an antenna enabling authentication by employing radio frequency identification (RFID) or near field communication (NFC); and authentication information provided on the exposed surface of the first card layer or second card layer of the authentication card apparatus.

20. The authentication card apparatus of claim 19, further comprising one or more apertures provided on the fabric layer, through which a surface of the first card layer and a surface of the second card layer are bound together by heat treatment.

* * * * *